United States Patent
McMahon

[11] 3,708,217
[45] Jan. 2, 1973

[54] HOLOGRAPHIC NON-ISOTROPIC DIFFUSING SCREEN

[75] Inventor: Donald H. McMahon, Carlisle, Mass.

[73] Assignee: Sperry Rand Corporation

[22] Filed: April 28, 1971

[21] Appl. No.: 138,228

[52] U.S. Cl. .................................. 350/3.5, 161/3.5
[51] Int. Cl. ............................................ G02b 27/22
[58] Field of Search .................... 350/3.5; 161/3.5

[56] References Cited

UNITED STATES PATENTS 3,523,054   8/1970   Heflinger et al. ................... 350/3.5

OTHER PUBLICATIONS

Brooks et al., QE-2 "IEEE J. Quant. Elec." 275–279 (8/1966)
Sincerbox, 10 IBM Tech. Disc. Bull. 267, 268 (8/1967)

Primary Examiner—David Schonberg
Assistant Examiner—Robert L. Sherman
Attorney—S. C. Yeaton

[57] ABSTRACT

A method and apparatus for constructing a holographic non-isotropic diffusing screen to produce a diffuse light beam of predetermined directionality having use in micro-holographic recording and reading apparatus.

8 Claims, 4 Drawing Figures

INVENTOR
DONALD H. MC MAHON
BY

*HP Terry*
ATTORNEY

HOLOGRAPHIC NON-ISOTROPIC DIFFUSING SCREEN

BACKGROUND OF THE INVENTION

1. Field of the Invention

The present invention relates to holography and more particularly to a holographically constructed diffuser for providing a highly directional diffuse light beam.

2. Description of the Prior Art

Diffusing screens have general applicability in optical and holographic systems for scattering light, as required for example in certain non-coherent character recognition systems and micro-holographic recording and reading devices. A diffusing screen is characterized by the property of uniformly scattering incident light so that light from every point on the screen is directed to every point in some other plane, an observation or recording plane. This property becomes evident when an image is projected onto one side of an isotropic diffuser constructed from opal or ground glass to be viewed by an observer on the other side of the screen. Isotropic or uniform scattering enables the observer to view the image from any position in front of the screen; in other words, the image is presented through a wide field of view. This feature, while desirable in some applications, is undesirable in others, for instance where the image is required to be observed by only a single viewer as in the case of a microholographic readout device. A better understanding of the problem will be obtained after reading the subsequent description of the preferred embodiments; but for the moment suffice it to say that considerable, in fact most, of the available light energy is not used in a micro-holographic reader when the reconstructed image is presented through a uniform diffusing screen. On the other hand, the diffusing screen cannot be eliminated altogether without the need for introducing an alternative element such as a lens which has the disadvantage of materially tightening positional tolerances of both the system components and the location of the observer for undistorted viewing. Likewise, in a micro-holographic diffuse recording system where it is desired to converge a diffuse signal beam, as opposed to the focused beam of a Fourier transform recording, onto a small region of a holographic plate in superposed relation with a reference beam, it will be appreciated that considerable light loss will result when the signal beam is passed through a uniform diffuser prior to transmission through a data transparency containing the information to be recorded. It is thus seen that undesired light losses occur in both recording and reading apparatus incorporating conventional uniform diffusing screens. In view of this problem, the present invention is directed to a means and technique for constructing a directional diffusing screen which retains the property of a conventional diffuser, namely of scattering light from every point in the diffusing plane to every point in some other plane, but in such a way that the light in said other plane is concentrated in a predetermined area.

SUMMARY OF THE INVENTION

Apparatus for constructing a non-isotropic (directional or non-uniform) diffuser screen in accordance with the teaching of the present invention comprises a light source for providing coherently related, angularly separated reference and signal beams directed onto a recording holographic plate in superposed relation. The reference beam is preferably expanded by the combination of a short focal length lens and a collimating lens to produce a large diameter beam impinging on the holographic plate. An isotropic diffuser screen disposed in the path of the relatively smaller diameter signal beam uniformly scatters the signal beam to produce a diffuse diverging beam which strikes the holographic plate to interfere therein with the expanded reference beam and thereby produce a pattern representative of the size of the signal beam incident on the isotropic diffuser. After developing in accordance with conventional techniques the holographic plate constitutes a hologram which functions as a directional diffuser by virtue of reconstructing the diffuse signal beam when illuminated by an appropriate reference beam. Stated somewhat differently, the improvement of the present invention resides in the utilization of an isotropic diffuser alone in place of the object or input transparency normally employed in holographic recording systems or, alternatively, in place of the combination of an input transparency and an isotropic diffuser in order to form a hologram of the diffuser capable of providing a diffuse beam of predetermined directionality when illuminated by a reconstructing beam. A more detailed explanation of the method and apparatus of the invention and the use thereof in micro-holographic recording and reading systems is provided in the following description of the preferred embodiments.

DESCRIPTION OF THE PREFERRED EMBODIMENT

Figure 1:
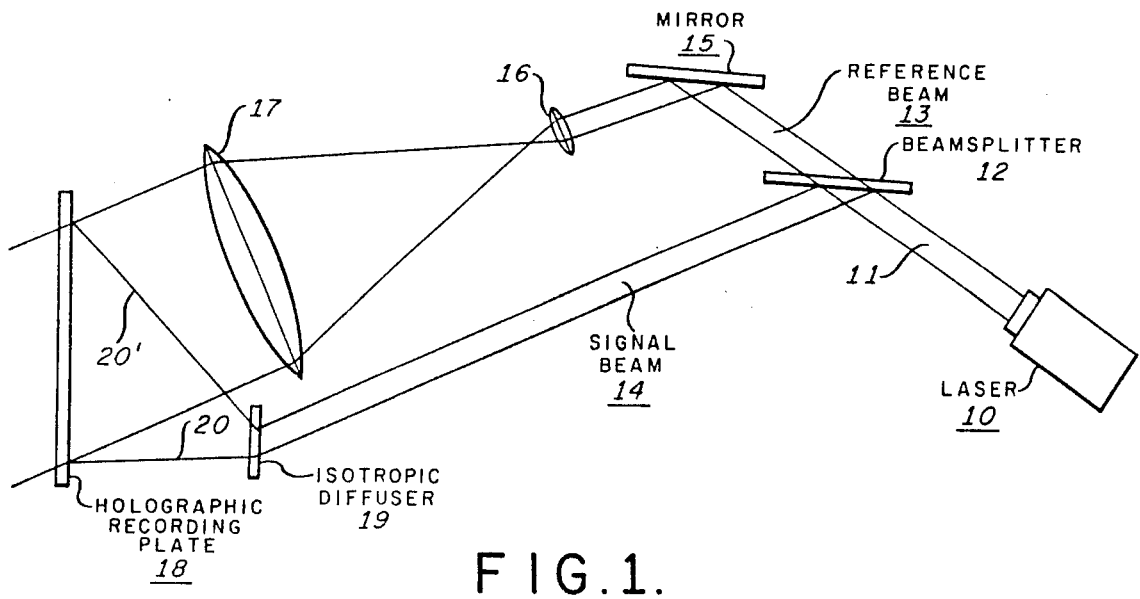
FIG. 1 is an optical schematic illustration of apparatus for constructing a non-isotropic diffusing screen in accordance with the principles of the present invention.

Referring to FIG. 1, apparatus for constructing a holographic non-isotropic diffuser comprises a laser 10 emitting a light beam 11 directed toward beam splitter 12 which divides the beam into a reference beam 13 and a signal beam 14. The reference beam reflects from mirror 15 onto microscope objective or other short focal length lens 16 which produces a widely diverging beam that is collected and collimated by lens 17 for transmission to holographic recording plate 18. A reference beam diameter of about 15 centimeters impinging on the holographic plate is suitable for constructing non-isotropic diffusers for use in micro-holographic devices. The signal beam simultaneously impinges on isotropic diffusing screen 19 and is scattered therethrough in the form of a diffuse beam denoted by lines 20, 20' onto holographic plate 18 in superposed relation with the expanded reference beam to produce an interference pattern representative of the diffusely scattered signal beam. It will be understood, of course, that the signal beam is actually scattered uniformly in all directions, that is, into a sphere surrounding the isotropic diffuser, so that only a fraction of the scattered light energy is actually confined within lines 20, 20' and therefore effective in producing the holographic pattern. Moreover, as indicated in the drawing, the size of the signal beam incident on the isotropic diffuser and the position of the latter relative to the holographic plate 18 determines the size of the solid angle confined within lines 20, 20'. An apertured plate could be used on either side of the isotropic diffuser to control the signal beam size but this is generally not desired since it is wasteful of light energy.

Figure 2:
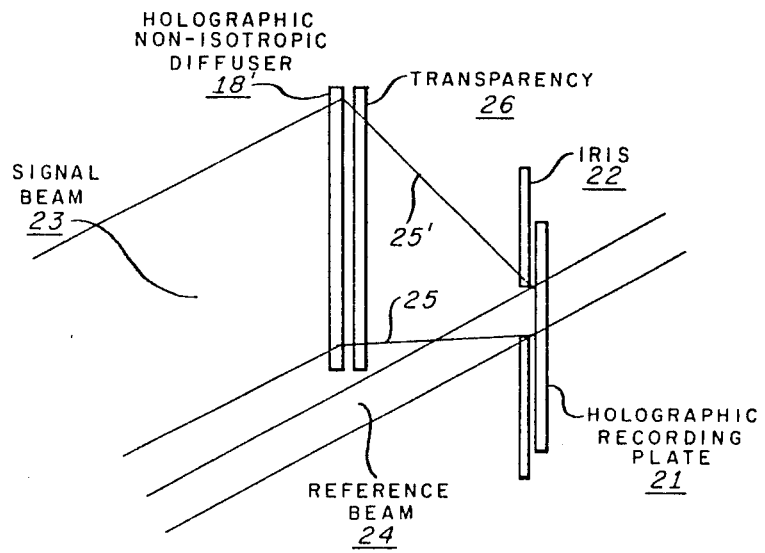
FIG. 2 is a schematic illustration of micro-holographic recording apparatus using a non-isotropic diffuser constructed with the apparatus of FIG. 1.

Upon being developed, the holographic recording plate 18 constitutes a holographic non-isotropic diffuser which functions to provide a highly directional diffuse beam as will be understood more fully after considering its use in the micro-holographic diffuse recording apparatus of FIG. 2 wherein the holographic recording plate 21 is an unexposed film or other holographic recording media similar to that used in the apparatus of FIG. 1. Holographic plate 21 is positioned in back of iris 22 to receive signal and reference beams 23 and 24, respectively, transmitted through the iris aperture. As in the case of the FIG. 1 apparatus, the signal and reference beams are typically derived from a common laser (not shown) so as to be coherently related. The reference beam is directly incident on holographic plate 21 while the signal beam propagates successively through the holographic non-isotropic diffuser 18' and transparency 26 containing the data to be recorded on the holographic plate.

It will be noted that signal beam 23 striking the nonisotropic diffuser 18' is preferably of the same diameter as the reference beam 13 of FIG. 1 at the point of incidence on holographic plate 18 and directed to impinge on the non-isotropic diffuser from a direction opposite to the incidence of reference beam 13 on holographic plate 18. Under these conditions, the signal beam 23 is diffracted by the non-isotropic diffuser 18' to produce a directional diffuse beam confined within lines 25, 25' conforming to the relative angles of lines 20, 20' of FIG. 1. Thus, all or at least most of the light scattered by the non-isotropic diffuser is directed through the aperture in iris 22 rather than being uniformly radiated into a sphere as in the case of a uniform diffuser.

For a recording situation in which the iris 22 is the same distance from non-isotropic diffuser 18' as the isotropic diffuser 19 was displaced from the holographic recording plate 18 in the apparatus of FIG. 1, it will be appreciated that the iris aperture should be of approximately the same size as that of the signal beam incident on the isotropic diffuser for efficient use of the diffracted diffuse light provided by the non-isotropic diffuser. The iris can be placed relatively closer or further away from the non-isotropic diffuser, if desired, but in each instance will have to be made relatively larger or smaller, respectively, for precise accommodation of the diffracted diffuse beam.

An appreciation of the degree of gain in optical brightness that accrues from the use of a non-isotropic diffuser as compared to the prior art isotropic diffusers will be obtained from the following quantitative example. Assume that a conventional opal or ground glass diffuser is used at a distance of 10 centimeters from an iris aperture having an area of 0.05 square centimeters, a typical value for a micro-holographic diffuse recording system. With this setup the diffused light will be scattered uniformly into a sphere having a surface area of 1,200 square centimeters at 10 centimeters from the diffuser and, consequently, only 0.05/1,200 of the scattered light will pass through the iris aperture to the recorder holographic recording plate. Since only a very small fraction of the available light is utilized, either unduly long exposure times or greatly increased laser power will be required to make the holographic recording. By the provision of a non-isotropic diffuser, however, which can be made to concentrate the light on an area of 1 square centimeter or less, the brightness of the signal beam directed onto the recording plate is increased substantially thereby enabling suitable recordings to be made with considerably shorter exposure times and/or much lower laser power.

Figure 3:
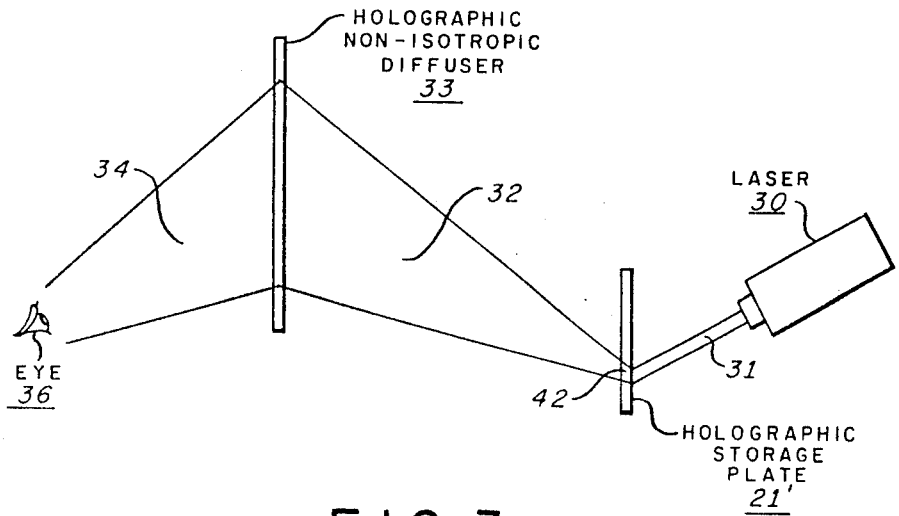
FIG. 3 is a schematic illustration of a micro-holographic reader apparatus incorporating a non-isotropic diffuser.

A micro-holographic reader apparatus for reading out the data recorded in the apparatus of FIG. 2 is shown in FIG. 3. The reader comprises a laser 30 directing a light beam 31 onto holographic storage plate 21' (the recording plate of FIG. 2) to produce a diverging data beam 32 which provides a reconstructed image of the holographically stored data (the transparency data of FIG. 2) at the plane of non-isotropic diffuser 33. The non-isotropic diffuser, in turn, scatters the reconstructed image light in a manner to produce the converging beam 34 preferentially directed to a small area on the order of 5 × 15 centimeters at the observer location indicated by the eye symbol 36.

Figure 4:
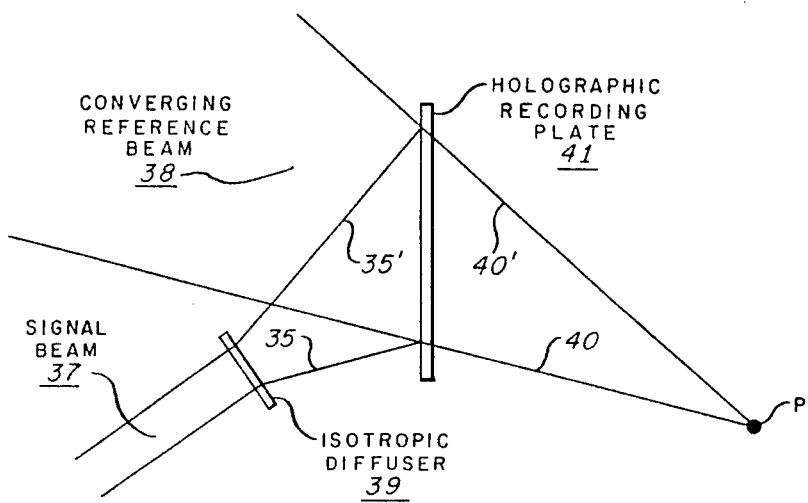
FIG. 4 is a schematic illustration of an alternate means for constructing a non-isotropic diffusing screen for use in the reader apparatus of FIG. 3.

In view of the previous description relating to the apparatus of FIG. 1, it will be appreciated that a collimated reference beam is not suitable for constructing the holographic non-isotropic diffuser if it is desired to obtain a converging image beam 34 as shown in FIG. 3. Accordingly, apparatus for constructing a non-isotropic diffuser for use in the reader of FIG. 3 is shown in FIG. 4. Here again the signal beam 37 and converging reference beam 38 are preferably derived from a common laser source so as to be coherently related. An isotropic diffuser 39 uniformly scatters the signal beam in the manner explained with reference to FIG. 1 so that scattered signal light confined within lines 35, 35' impinges on holographic recording plate 41 in superposed relation with the reference beam 38 which converges to point P. After development of the holographic recording plate 41, it constitutes a non-isotropic diffuser suitable for use in the apparatus of FIG. 3.

The similarity of the geometry of FIGS. 3 and 4 will be noted. In the apparatus of FIG. 4 a diverging beam denoted by lines 40, 40' will reconstruct a directional diffuse signal beam confined within lines 35, 35'. Likewise, in the apparatus of FIG. 3, the small area of the holographic recording 42 (approximately 0.05 square centimeters) can be regarded as a point source providing a data beam 32 of the same angular dimension as the beam emanating from point P. Hence, when the holographic storage plate 21' is located at about the same distance from non-isotropic diffuser 33 as point P is removed from the recording plate 41 of FIG. 4, the converging image beam 34 will have the same diameter, at a distance from the non-isotropic diffuser 33 equal to the distance between the isotropic diffuser 39 and recording plate 41, as that of the signal beam emanating from isotropic diffuser 39. It will be appreciated, however, that the relative distances used in the recording and reading apparatus can be different if so desired for one reason or another.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A method for providing a directional diffuse light beam of predetermined convergence, comprising the steps of providing first and second coherently related light beams for incidence on a holographic recording plate in angularly separated and at least partially superposed relation, positioning an isotropic diffusing means in the path of the first beam for uniformly diffusing said first beam, disposing a holographic recording medium to receive the second beam and a diverging portion of the first beam emanating from the isotropic diffusing means to record an interference pattern representative of the size of said diverging portion at the location of the isotropic diffusing means, removing the isotropic diffusing means and the first and second beams, and propagating a light beam onto the holographic recording medium antidirectional to the second beam whereby a diffuse converging beam is produced conforming to the solid angle dimensions of said diverging portion of the first beam incident on the holographic recording medium during recording of the interference pattern.

2. The method of claim 1 wherein the second beam incident on the holographic recording medium is substantially larger than said diverging portion of the first beam at the location of the isotropic diffusing means.

3. The method of claim 1 wherein the first and second beams are derived from a comparatively small laser beam and further including the step of disposing beam expanding and collimating means in the path of the second beam for directing the second beam onto the holographic recording medium as a collimated beam substantially larger than the first beam impinging on the isotropic diffusing means.

4. A method of constructing a non-isotropic diffusing screen for providing a diffuse light beam of predetermined convergence comprising the steps of providing first and second coherently related light beams, positioning a holographic recording means in the path of the second beam, and positioning isotropic diffusing means in the path of the first beam, absent a recording object, for uniformly diffusing said first beam such that a diverging portion thereof is incident in angularly separated and at least partially superposed relation with the second beam on said holographic recording means to form an interference pattern therein representative of the size of the first beam striking the isotropic diffusing means whereby subsequent illumination of said holographic recording medium with a single light beam propagated opposite to the direction of the second beam reconstructs said diverging portion of the first beam incident on the holographic recording means to produce a diffuse converging beam.

5. The method of claim 1 wherein the second beam is a converging beam converging to a point in back of the holographic recording medium on the side opposite the side on which the first and second beams impinge.

6. Apparatus for constructing a non-isotropic diffusing screen for providing a diffuse converging light beam comprising means for providing first and second coherently related light beams, holographic recording means disposed in the path of the second beam, isotropic diffusing means positioned in the path of the first beam, in the absence of a recording object, for uniformly diffusing said first beam so that a portion thereof diverging from said isotropic diffusing means impinges on said holographic recording medium in angularly separated and at least partially superposed relation with the second beam to form an interference pattern in said holographic recording means representative of the size of the first beam striking said isotropic diffusing means whereby subsequent illumination of said holographic recording medium with a single light beam propagated opposite to the direction of the second beam reconstructs said diverging portion of the first beam incident on said holographic recording means to produce the diffuse converging beam.

7. The apparatus of claim 6 including beam expander means disposed in the path of the second beam for enlarging the size thereof so as to be substantially equivalent in size to said diverging diffuse beam at the location of the recording medium.

8. Holographic recording apparatus comprising holographic recording means, means including a light source for providing first and second spaced coherently related light beams directed in angularly separated and at least partially superposed relation onto said recording means for producing an interference pattern representative of an object disposed in the path of the first beam intermediate said light source and said recording means, and holographic non-isotropic diffusing means disposed proximate the object for directing light scattered from the object onto said recording means as a diffuse converging beam to impinge on a prescribed area of the recording means.

* * * * *